(12) United States Patent
Adami et al.

(10) Patent No.: US 9,839,255 B2
(45) Date of Patent: Dec. 12, 2017

(54) SOLE STRUCTURE FOR ARTICLE OF FOOTWEAR

(75) Inventors: Giovanni Adami, Montebelluna (IT);
Perry W. Auger, Tigard, OR (US);
Sergio Cavaliere, Venezia (IT);
Timothy J. Smith, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 1053 days.

(21) Appl. No.: 13/528,306

(22) Filed: Jun. 20, 2012

(65) Prior Publication Data

US 2013/0340295 A1 Dec. 26, 2013

(51) Int. Cl.
| | |
|---|---|
| A43B 5/02 | (2006.01) |
| A43B 13/12 | (2006.01) |
| A43C 15/16 | (2006.01) |
| A43B 13/04 | (2006.01) |
| A43B 13/14 | (2006.01) |
| A43B 13/16 | (2006.01) |
| A43B 13/26 | (2006.01) |
| A43B 13/41 | (2006.01) |
| A43B 13/42 | (2006.01) |
| B29D 35/00 | (2010.01) |
| B29D 35/04 | (2010.01) |

(Continued)

(52) U.S. Cl.
CPC ............... *A43B 5/02* (2013.01); *A43B 13/04* (2013.01); *A43B 13/12* (2013.01); *A43B 13/14* (2013.01); *A43B 13/146* (2013.01); *A43B 13/16* (2013.01); *A43B 13/26* (2013.01); *A43B 13/41* (2013.01); *A43B 13/42* (2013.01); *A43C 15/161* (2013.01); *A43C 15/162* (2013.01); *B29D 35/0054* (2013.01); *B29D 35/04* (2013.01); *B29D 35/122* (2013.01); *B29D 35/142* (2013.01)

(58) Field of Classification Search
CPC ..... A43B 15/16; A43B 15/161; A43B 15/162; A43B 5/02; A43B 13/12; A43B 13/26; A43C 15/16; A43C 15/161; A43C 15/162
USPC .......... 36/25 R, 30 R, 67 A, 59 A, 59 B, 107
See application file for complete search history.

(56) References Cited

U.S. PATENT DOCUMENTS

| | | |
|---|---|---|
| 2,448,455 A | 8/1948 | Murray |
| 3,333,352 A | 8/1967 | Livingston |
| 4,085,526 A | 4/1978 | Hemmer |

(Continued)

FOREIGN PATENT DOCUMENTS

| | | |
|---|---|---|
| CN | 1266355 A | 9/2000 |
| CN | 2464112 Y | 12/2001 |

(Continued)

OTHER PUBLICATIONS

International Search Report and Written Opinion dated Sep. 9, 2013 in International Application No. PCT/US2013/046457.

(Continued)

*Primary Examiner* — Sharon M Prange
(74) *Attorney, Agent, or Firm* — Honigman Miller Schwartz and Cohn LLP; Matthew H. Szalach; Jonathan P. O'Brien

(57) ABSTRACT

A sole structure for an article of footwear includes an outer fabric layer and an inner chassis that is more rigid than the fabric layer. The fabric layer includes a plurality of fabric protrusions and the inner chassis includes a plurality of chassis protrusions that correspond to the fabric protrusions. Both the fabric protrusions and the chassis protrusions extend into cleat members of the sole structure.

18 Claims, 16 Drawing Sheets

(51) Int. Cl.
*B29D 35/12* (2010.01)
*B29D 35/14* (2010.01)

(56) References Cited

U.S. PATENT DOCUMENTS

| | | | |
|---|---|---|---|
| 4,380,878 A * | 4/1983 | Skaja | A43B 13/26 |
| | | | 36/129 |
| 4,747,220 A | 5/1988 | Autry et al. | |
| 4,787,156 A | 11/1988 | Bade | |
| 5,367,791 A | 11/1994 | Gross et al. | |
| 6,145,221 A * | 11/2000 | Hockerson | 36/126 |
| 6,954,998 B1 | 10/2005 | Lussier | |
| 6,957,503 B2 * | 10/2005 | De Paoli | 36/67 D |
| 6,973,746 B2 | 12/2005 | Auger et al. | |
| 7,406,781 B2 | 8/2008 | Scholz | |
| 7,536,810 B2 | 5/2009 | Jau et al. | |
| 7,730,636 B2 | 6/2010 | Auger et al. | |
| 7,802,379 B2 | 9/2010 | Gerber | |
| 7,854,076 B2 * | 12/2010 | Keppler | A43B 5/02 |
| | | | 12/142 P |
| 2003/0029060 A1 | 2/2003 | Hockerson et al. | |
| 2004/0163283 A1 | 8/2004 | Daniels et al. | |
| 2007/0251128 A1 * | 11/2007 | Yen | 36/134 |
| 2009/0235558 A1 | 9/2009 | Auger et al. | |
| 2009/0300945 A1 | 12/2009 | Droege et al. | |
| 2010/0126044 A1 | 5/2010 | Davis | |
| 2012/0180343 A1 | 7/2012 | Auger et al. | |
| 2013/0139412 A1 * | 6/2013 | Auger et al. | 36/25 R |
| 2013/0318831 A1 * | 12/2013 | Foxen | 36/25 R |

FOREIGN PATENT DOCUMENTS

| | | |
|---|---|---|
| CN | 1334054 A | 2/2002 |
| CN | 1993064 A | 7/2007 |
| CN | 101808543 A | 8/2010 |
| DE | 3703932 | 8/1988 |
| DE | 19708113 | 9/1998 |
| DE | 102005046138 | 3/2007 |
| EP | 0533570 | 3/1993 |
| EP | 0723745 | 7/1996 |
| GB | 1063516 | 3/1967 |
| NL | 6807569 | 12/1969 |
| WO | 2010115004 | 10/2010 |
| WO | 2011050038 | 4/2011 |

OTHER PUBLICATIONS

International Preliminary Report on Patentability (including Written Opinion of the ISA) dated Dec. 23, 2014 in International Application No. PCT/US2013/046457.
State Intellectual Property Office, Chinese Office Action for Application No. 201380032150.4, dated Dec. 2, 2016.
European Patent Office, Communication pursuant to Article 94(3) EPC for Application No. 13734241.6, dated Feb. 2, 2017.

* cited by examiner

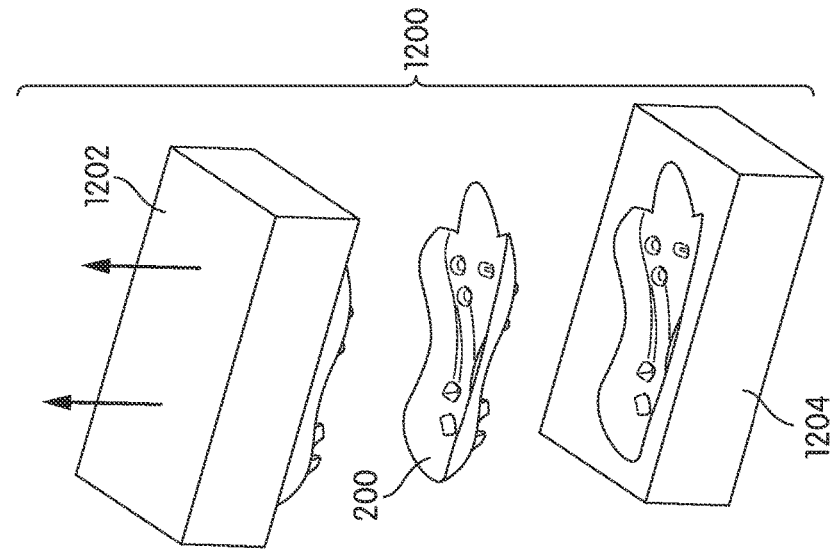
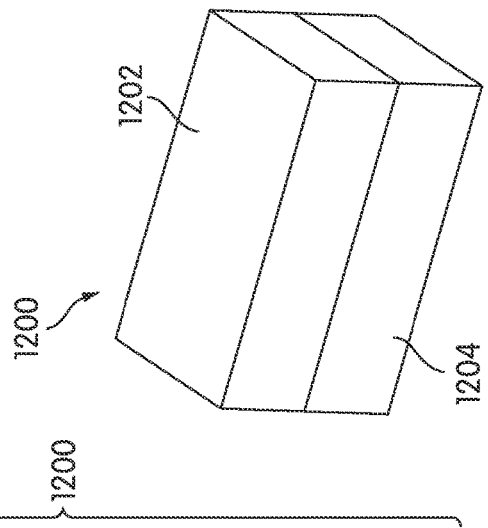
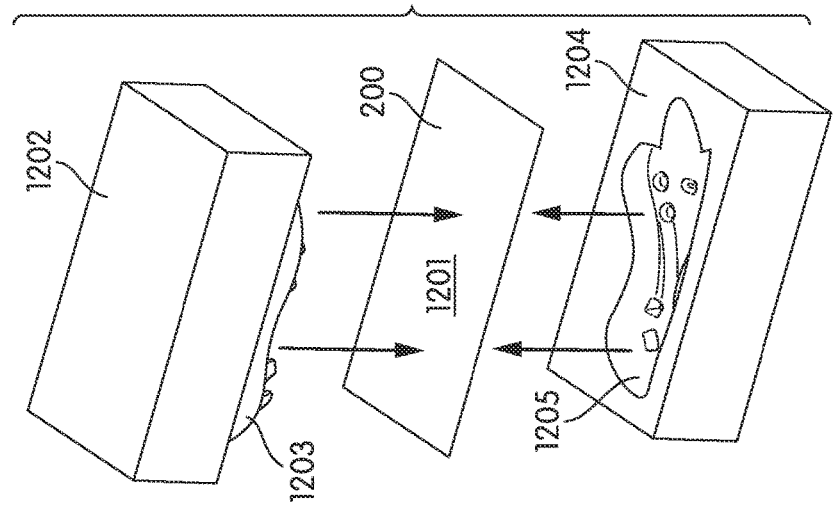

SOLE STRUCTURE FOR ARTICLE OF FOOTWEAR

BACKGROUND

The present embodiments relate generally to articles of footwear, and in particular to a sole structure for articles of footwear and a method of making the sole structure.

Articles of footwear generally include two primary elements: an upper and a sole. The upper may be formed from a variety of materials that are stitched or adhesively bonded together to form a void within the footwear for comfortably and securely receiving a foot. The sole is secured to a lower portion of the upper and is generally positioned between the foot and the ground. In many articles of footwear, including athletic footwear styles, the sole often incorporates an insole, a midsole, and an outsole.

SUMMARY

In one aspect, a sole structure for an article of footwear includes a fabric layer with an exterior surface and an interior surface as well as an inner chassis disposed against the interior surface of the fabric layer. The fabric layer includes a fabric protrusion extending outwardly from the exterior surface. The sole structure also includes a cleat member. The fabric protrusion is disposed within the cleat member.

In another aspect, a method of making a sole structure for an article of footwear includes shaping a fabric layer to form an exterior layer of the sole structure, where the fabric layer is shaped to have at least one fabric protrusion. The method further includes molding an inner chassis against an interior surface of the fabric layer. The method further includes molding a cleat member to the fabric protrusion.

In another aspect, a sole structure for an article of footwear includes a fabric layer including an exterior surface and an interior surface. An inner chassis is disposed against the interior surface of the fabric layer. The sole structure also includes a cleat member including an exterior portion and an interior portion, where the exterior portion is attached to a portion of the fabric layer and where the interior portion is attached to a portion of the inner chassis.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 12 is a schematic view of a fabric layer being associated with a thermoforming mold, according to one embodiment;

FIG. 13 is a schematic view of the thermoforming mold of FIG. 12 closed around the fabric layer;

FIG. 14 is a schematic view of a shaped fabric layer resulting from the thermoforming process of FIG. 13;

DETAILED DESCRIPTION

Figure 1:
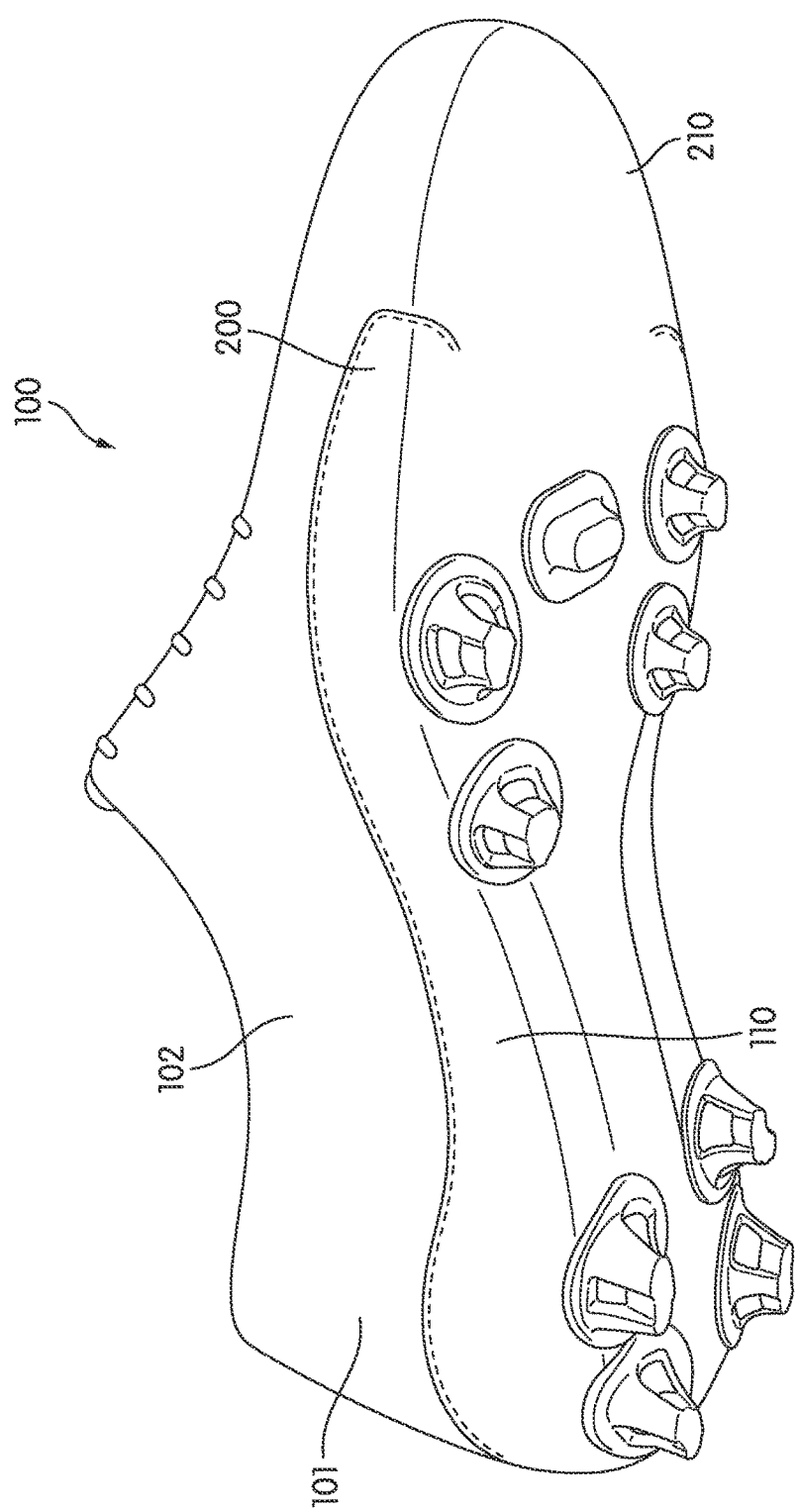
FIG. 1 is an isometric view of an embodiment of an article of footwear.

FIG. 1 illustrates an isometric view of an embodiment of article of footwear 100. For clarity, the following detailed description discusses an exemplary embodiment, in the form of a sports shoe, but it should be noted that the present embodiments could take the form of any article of footwear including, but not limited to: hiking boots, soccer shoes, football shoes, sneakers, rugby shoes, basketball shoes, baseball shoes as well as other kinds of shoes. As shown in FIG. 1, article of footwear 100, also referred to simply as article 100, is intended to be used with a right foot; however, it should be understood that the following discussion may equally apply to a mirror image of article of footwear 100 that is intended for use with a left foot.

Article 100 can include upper 102 and sole structure 110. Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper.

In some embodiments, sole structure 110 may be configured to provide traction for article 100. In addition to providing traction, sole structure 110 may attenuate ground reaction forces when compressed between the foot and the ground during walking, running or other ambulatory activities. The configuration of sole structure 110 may vary significantly in different embodiments to include a variety of conventional or non-conventional structures. In some cases, the configuration of sole structure 110 can be configured according to one or more types of ground surfaces on which sole structure 110 may be used. Examples of ground surfaces include, but are not limited to: natural turf, synthetic turf, dirt, as well as other surfaces.

Sole structure 110 is secured to upper 102 and extends between the foot and the ground when article 100 is worn. In different embodiments, sole structure 110 may include different components. For example, sole structure 110 may include an outsole, a midsole, and/or an insole. In some cases, one or more of these components may be optional.

In some embodiments, upper 102 and sole structure 110 may be configured to provide article 100 with a unibody-like appearance. In some embodiments, upper 102 and sole structure 110 may present substantially similar design characteristics on outer surface 101 of article 100. For example, in some embodiments, sole structure 110 and upper 102 may be made to look and/or feel substantially similar in color, texture, materials as well as other visual and/or tactile characteristics. However, still other embodiments could make use of an upper and sole structure that are substantially distinct in visual and/or tactile characteristics, as is commonly found in various kinds of articles.

Figure 2:
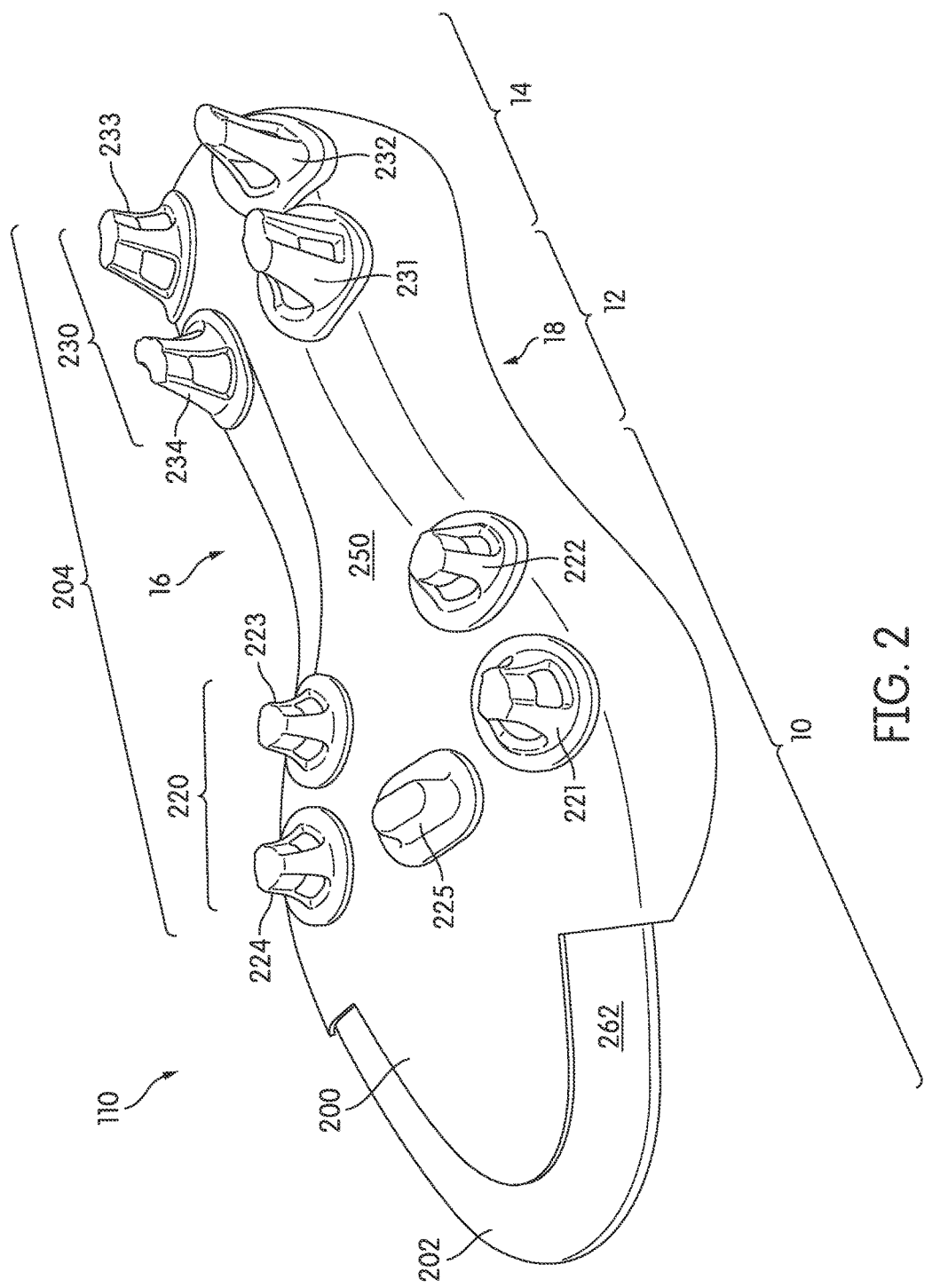
FIG. 2 is an isometric view of an exterior side of an embodiment of a sole structure for an article of footwear.
Figure 3:
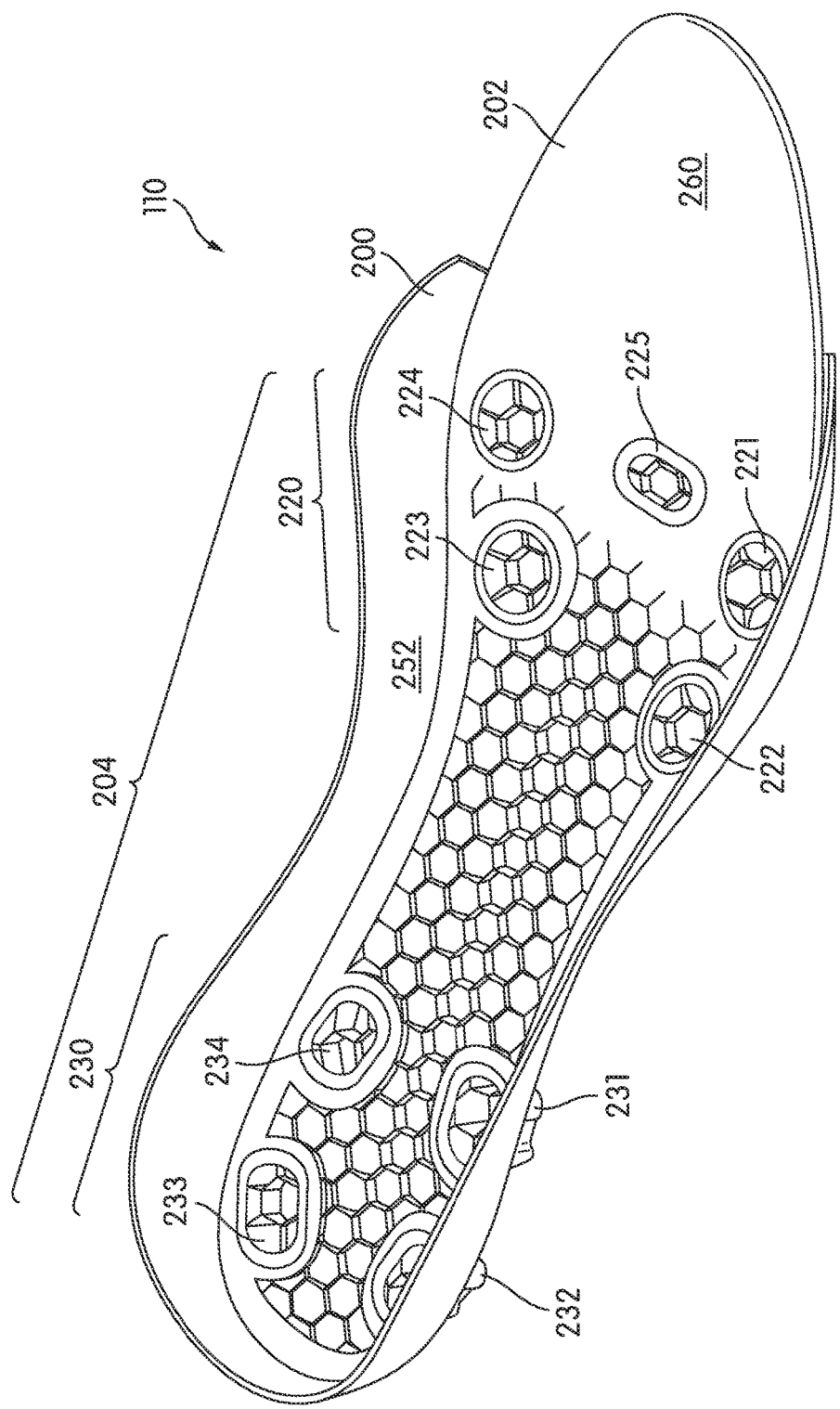
FIG. 3 is an isometric view of an interior side of the sole structure of FIG. 2.
Figure 4:
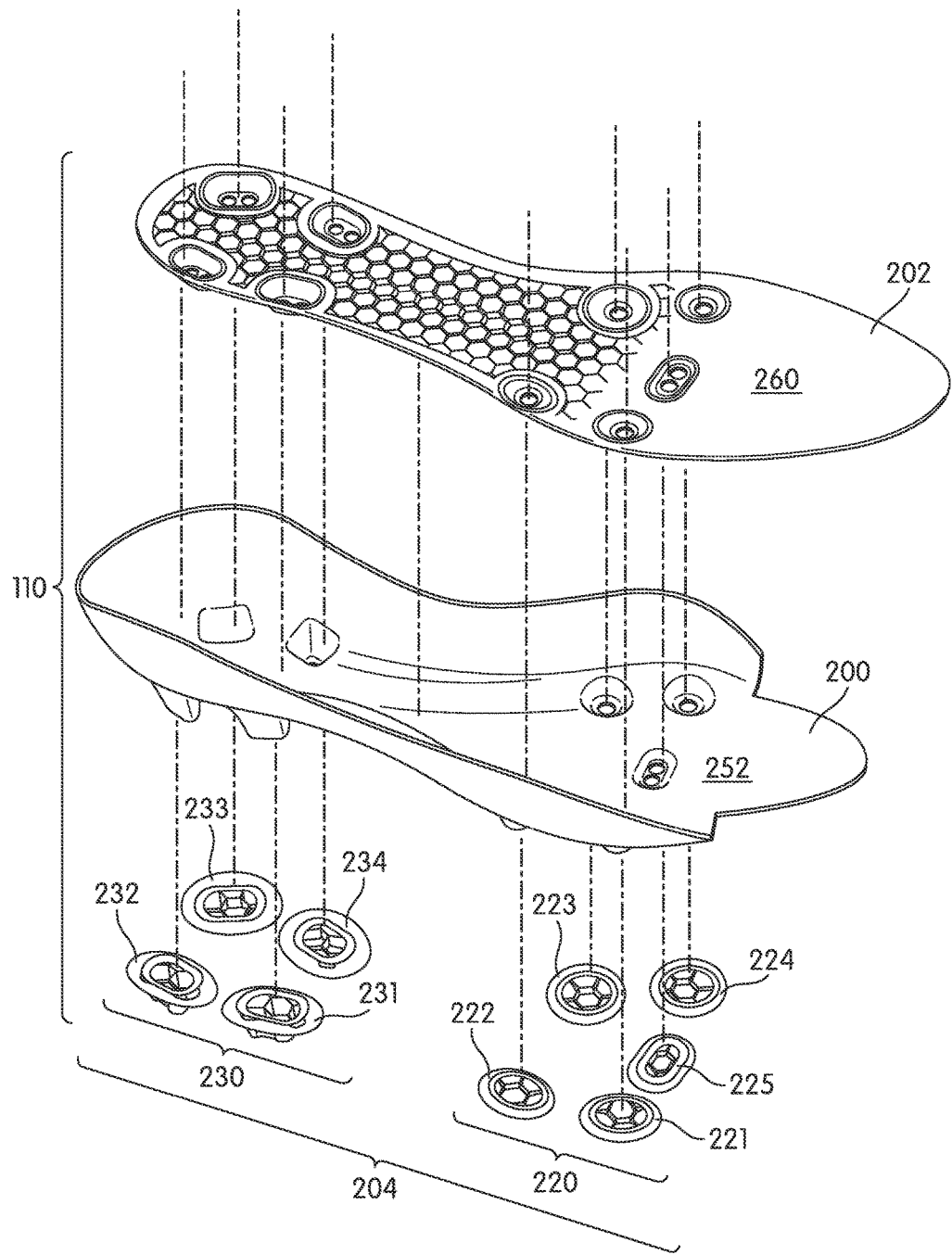
FIG. 4 is an isometric exploded view of the sole structure of FIG. 3.

FIGS. 2 through 4 illustrate isometric views of sole structure 110, according to one embodiment. For purposes of clarity, sole structure 110 is shown in isolation without upper 102. In particular, FIG. 2 illustrates an isometric view of a bottom side of sole structure 110, FIG. 3 illustrates an isometric view of a top side of sole structure 110 and FIG. 4 illustrates an isometric exploded view of sole structure 110, according to an embodiment.

Referring first to FIG. 2, for purposes of reference, sole structure 110 may be divided into forefoot portion 10, midfoot portion 12 and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. In addition, sole structure 110 may include lateral side 18 and medial side 16. In particular, lateral side 18 and medial side 16 may be opposing sides of sole structure 110. Furthermore, both lateral side 18 and medial side 16 may extend through forefoot portion 10, midfoot portion 12 and heel portion 14.

It will be understood that forefoot portion 10, midfoot portion 12 and heel portion 14 are only intended for purposes of description and are not intended to demarcate precise regions of sole structure 110. Likewise, lateral side 18 and medial side 16 are intended to represent generally two sides of a sole structure, rather than precisely demarcating sole structure 110 into two halves. Similar terms may be used in describing similar portions of other components of article 100, including sub-components of sole structure 110. For example, various components of sole structure 110 may also comprise similar forefoot, midfoot and heel portions, as well as lateral and medial sides.

For consistency and convenience, directional adjectives are employed throughout this detailed description corresponding to the illustrated embodiments. The term "longitudinal" as used throughout this detailed description and in the claims refers to a direction extending a length of a component, such as sole structure 110. In some cases, the longitudinal direction may extend from a forefoot portion to a heel portion of the component. Also, the term "lateral" as used throughout this detailed description and in the claims refers to a direction extending a width of a component. In other words, the lateral direction may extend between a medial side and a lateral side of an article. Furthermore, the term "vertical" as used throughout this detailed description and in the claims refers to a direction generally perpendicular to a lateral and longitudinal direction. For example, in cases where a sole structure is planted flat on a ground surface, the vertical direction may extend from the ground surface upward. In addition, the term "proximal" refers to a portion of a footwear component that is closer to a portion of a foot when an article of footwear is worn. Likewise, the term "distal" refers to a portion of a footwear component that is further from a portion of a foot when an article of footwear is worn. It will be understood that each of these directional adjectives may be applied to individual components of an article, such as an upper and/or a sole structure as well as to sub-components of an upper or sole structure.

Referring now to FIGS. 2 through 4, sole structure 110 comprises various different components. In some embodiments, sole structure 110 may comprise fabric layer 200, inner chassis 202 and plurality of cleat members 204. The term "fabric layer" as used throughout this detailed description and in the claims refers to any layer of fabric or fabric-like materials. Examples of fabric materials include any textiles made of natural or artificial fibers formed by weaving, knitting, crocheting, knotting, or pressing fibers together. A fabric layer can be configured with a planar or non-planar geometry. As discussed in further detail below, in some embodiments, fabric layer 200 may be configured with a non-planar, curved or contoured geometry. In some embodiments, fabric layer 200 may comprise an exterior layer for sole structure 110. When viewing article 100 in a fully assembled form, as shown in FIG. 1 for example, fabric layer 200 may be visible. Moreover, as seen in FIGS. 1 and 2, fabric layer 200 may be configured as the primary ground contacting portion of article 100 along with plurality of cleat members 204, which extend outwardly from fabric layer 200.

In different embodiments, the length of fabric layer 200 could vary. In some embodiments, for example, fabric layer 200 may extend across the full length of article 100. In other cases, however, fabric layer 200 may only extend over a fraction of the entire length of article 100. For example, in the current embodiment, fabric layer 200 may extend a length between 75% and 95% of the length of article 100. In some embodiments, the length of fabric layer 200 may be less than the full length of article 100 in order to provide room for toe lasting of upper 102, in which material from upper 102 may be folded around the peripheral edge 210 (see FIG. 1) of forefoot portion 10 and attached to fabric layer 200. In other embodiments, the length could be selected to have any other value, including any other percentage of the total length of article 100, according to various factors such as lasting methods, inner chassis size, as well as any other factors. Moreover, other dimensions of fabric layer 200, such as the width, may vary from one embodiment to another and can be selected according to similar factors as those described for selecting a length.

In some embodiments, inner chassis 202 comprises an interior component of sole structure 110 that may not be visible when article 100 is fully assembled (as shown in FIG. 1). Inner chassis 202 may generally be configured to provide strength and support for sole structure 110. Moreover, in one embodiment, inner chassis 202 may extend over a full length of article 100 in order to provide support throughout the forefoot, midfoot and heel regions of a foot. In still other embodiments, however, inner chassis 202 may have a length that is less than the full length of article 100. In different embodiments, therefore, the length of inner chassis 202 may be selected according to the type of support desired in various regions.

In some embodiments, plurality of cleat members 204 may comprise one or more ground contacting members that are configured to engage, and partially insert into, a ground surface. Plurality of cleat members 204 may be further divided into forefoot cleat member set 220 and heel cleat member set 230. Forefoot cleat member set 220 comprises first forefoot cleat member 221, second forefoot cleat member 222, third forefoot cleat member 223, fourth forefoot cleat member 224 and fifth forefoot cleat member 225. Heel cleat member set 230 comprises first heel cleat member 231, second heel cleat member 232, third heel cleat member 233 and fourth heel cleat member 234.

The embodiments shown in the figures and described here show an exemplary configuration for forefoot cleat member set 220 and heel cleat member set 230. In other embodiments, however, the configuration of cleat members in each set could vary and could be selected according to desired traction properties in forefoot portion 10 and heel portion 14, for example. Moreover, the number of cleat members comprising plurality of cleat members 204 could also vary to achieve various traction characteristics. It will be understood that while the current embodiment illustrates a configuration that comprises substantially independent cleat members, other embodiments could incorporate two or more cleat members that may be connected in some way. As one alternative example, an embodiment could incorporate two or more cleat members that extend outwardly from a common base portion.

In some embodiments, fabric layer 200 may comprise an exterior surface 250 and an interior surface 252. Exterior surface 250 is oriented outwardly on sole structure 110, while interior surface 252 may be oriented inwardly (e.g. towards the interior components of sole structure 110 and article 100). Likewise, inner chassis 202 may comprise a first surface 260 and a second surface 262. In some cases, second surface 262 of inner chassis 202 may face towards interior surface 252 of fabric layer 200. Moreover, when assembled together, interior surface 252 of fabric layer 200 and second surface 262 of inner chassis 202 may be directly adjacent to one another.

As described in further detail below, in some embodiments, plurality of cleat members 204 may be configured to extend through both fabric layer 200 and inner chassis 202. In particular, some portions of plurality of cleat members 204 may be disposed on exterior surface 250 of fabric layer 200, while other portions of plurality of cleat members 204 may be disposed on first surface 260 of inner chassis 202. This arrangement may help to anchor plurality of cleat members 204 within sole structure 110, as described in further detail below.

Figure 5:
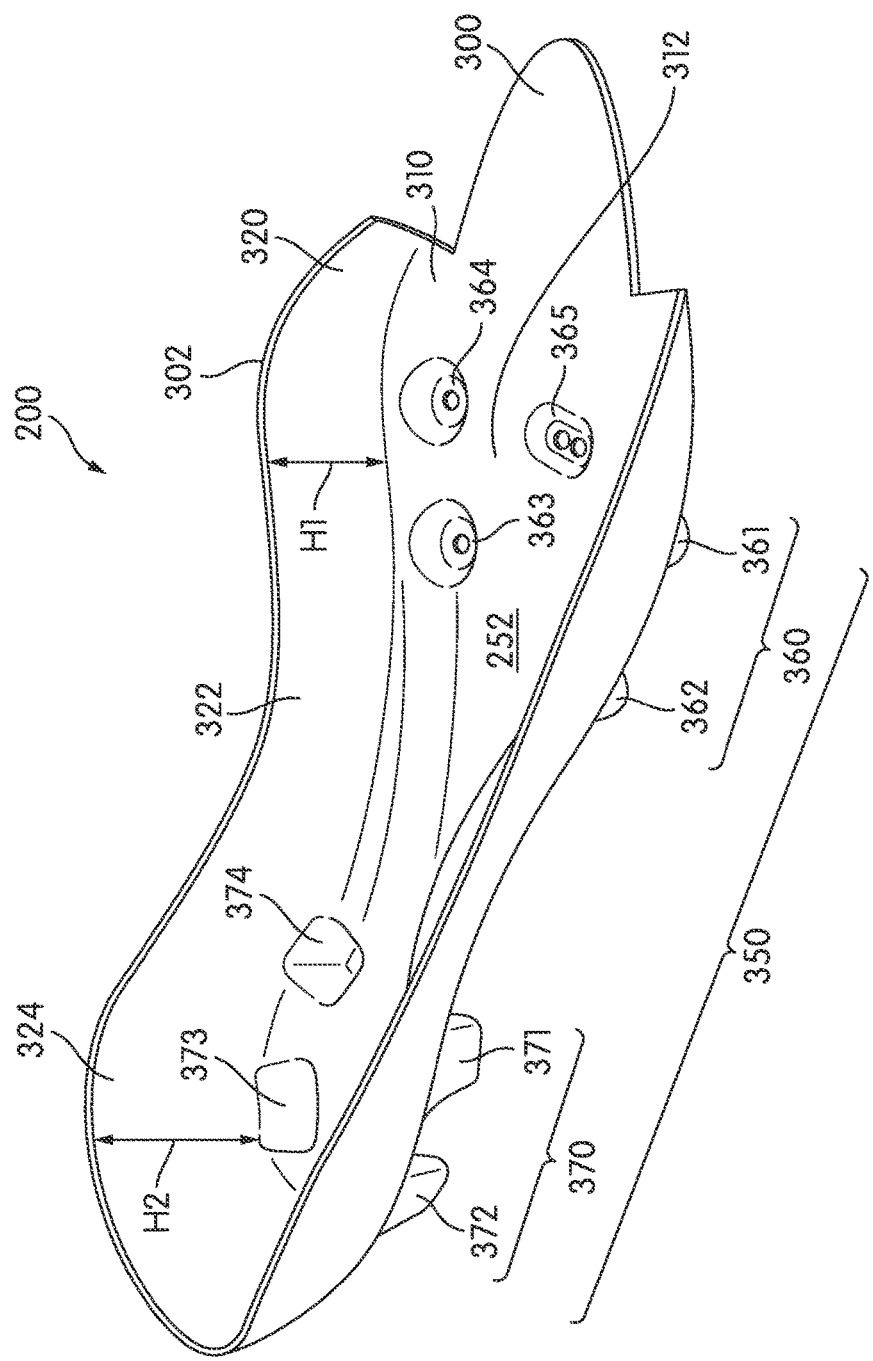
FIG. 5 is an isometric view of an interior surface of a fabric layer, according to one embodiment.
Figure 6:
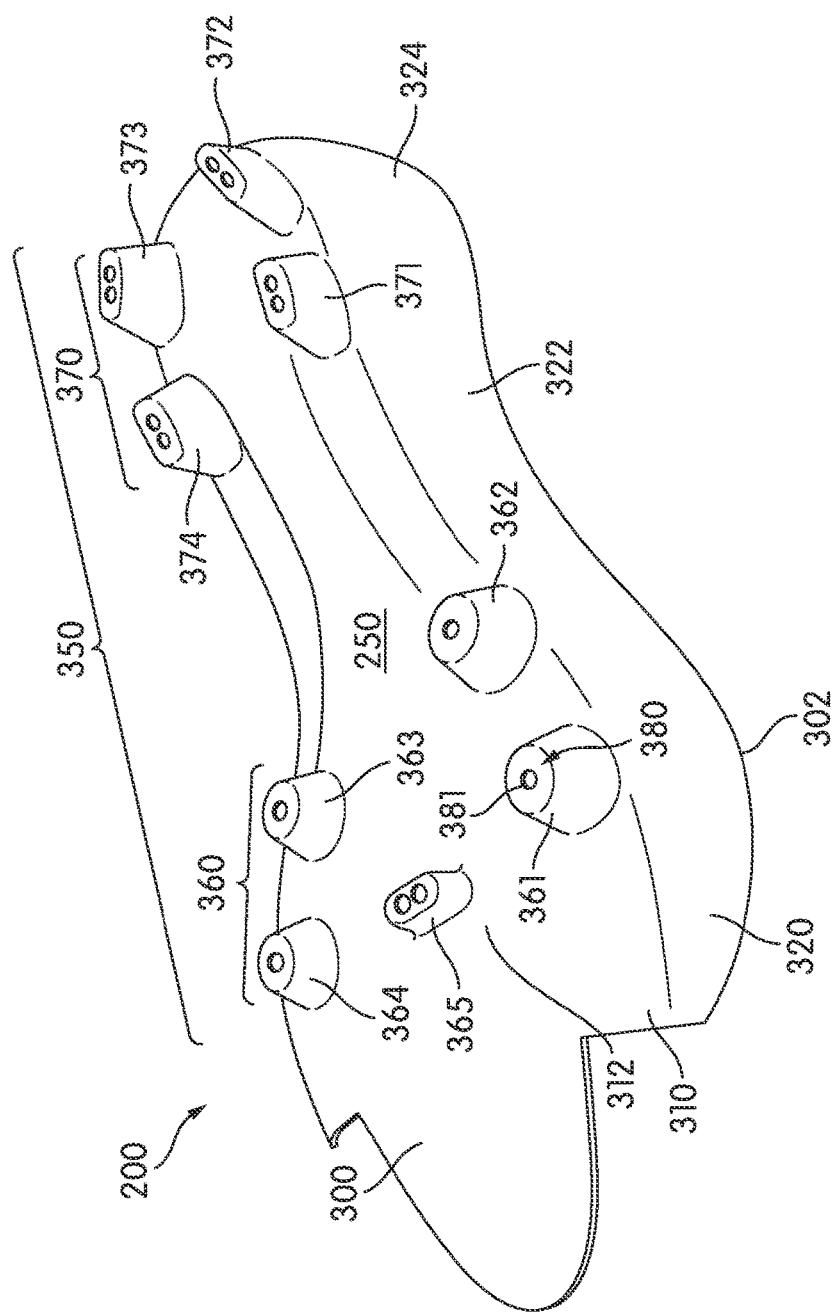
FIG. 6 is an isometric view of an exterior surface of a fabric layer, according to one embodiment.

FIGS. 5 and 6 illustrate isolated isometric views of an embodiment of fabric layer 200. In particular, FIG. 5 illustrates an isometric view of interior surface 252 of fabric layer 200, while FIG. 6 illustrates an isometric view of exterior surface 250 of fabric layer 200. Referring to FIGS. 5 and 6, fabric layer 200 may have a generally non-planar and/or contoured geometry. In some embodiments, fabric layer 200 comprises a base portion 300 as well as a contoured sidewall portion 302. In some embodiments, base portion 300 may be have the approximate shape of a last, and may generally comprise the region directly under the bottom of a foot when used in article 100. In some cases, base portion 300 may be further characterized by a peripheral portion 310 and a central portion 312 that is disposed inwardly from peripheral portion 310.

In some embodiments, sidewall portion 302 may be a raised portion that may be joined to base portion 300 at peripheral portion 310. In some cases, sidewall portion 302 may be further divided into a forefoot sidewall portion 320, a midfoot sidewall portion 322 and a heel sidewall portion 324. The properties of sidewall portion 302 may vary between forefoot sidewall portion 320, midfoot sidewall portion 322 and heel sidewall portion 324. Examples of properties that may vary include, but are not limited to, height, curvature, convexity, concavity, lateral displacement from peripheral portion 310 of base portion 300, as well as other properties. The characteristics of forefoot sidewall portion 320, midfoot sidewall portion 322 and heel sidewall portion 324 may be selected according to various desirable features including degree of lateral support and desired flexibility. For example, increased height in a portion of sidewall portion 302 may increase lateral support for the corresponding region of the foot. Similarly, in some cases, increasing the height and curvature of a portion of sidewall portion 302 may increase the resistance to bending of that portion.

In one embodiment, the height of sidewall portion 302 may generally increase from a height H1 at forefoot sidewall portion 320 to a height H2 at heel sidewall portion 324. In some embodiments, height H2 may be between 50% and 100% larger than height H1. In other embodiments, height H2 may be between 25% and 50% larger than height H1. Using this arrangement, heel sidewall portion 324 may function as a heel-cup and/or heel counter and thereby reduce the need for additional supporting structures to be built into other components of sole structure 110 and/or upper 102.

Fabric layer 200 may include provisions to enhance the functionality of cleat members. In some embodiments, the geometry of fabric layer 200 may be configured with features to facilitate attachment of, and stability for, one or more cleat members. In some embodiments, fabric layer 200 may comprise plurality of fabric protrusions 350. Plurality of fabric protrusions 350 may be structural features integrated into fabric layer 200. In some embodiments, plurality of fabric protrusions 350 correspond to portions of fabric layer 200 that are convex with respect to exterior surface 250 of fabric layer 200 and concave with respect to interior surface 252 of fabric layer 200. In other words, plurality of fabric protrusions 350 may generally protrude outwardly from exterior surface 250 and may likewise be characterized as recessed or sunken in, with respect to interior surface 252.

Plurality of fabric protrusions 350 may be further divided into forefoot fabric protrusion set 360 and heel fabric protrusion set 370. Forefoot fabric protrusion set 360 comprises first forefoot fabric protrusion 361, second forefoot fabric protrusion 362, third forefoot fabric protrusion 363, fourth forefoot fabric protrusion 364 and fifth forefoot fabric protrusion 365. Heel fabric protrusion set 370 comprises first heel fabric protrusion 371, second heel fabric protrusion 372, third heel fabric protrusion 373 and fourth heel fabric protrusion 374. In order to facilitate enhanced functionality for cleat members, the placement of plurality of fabric protrusions 350 may be selected such that each fabric protrusion is located in a region corresponding to an associated cleat member. For example, the number, size, approximate shape and configuration of fabric protrusions of forefoot fabric protrusion set 360 may generally correspond to the number, size, approximate shape and configuration of cleat members of forefoot cleat member set 220. Similarly, the number, size, approximate shape and configuration of fabric protrusions of heel fabric protrusion set 370 may generally correspond to the number, size, approximate shape and configuration of cleat members of heel cleat member set 230. As described in further detail below, this arrangement may allow each fabric protrusion of fabric layer 200 to act as a reinforcing portion for a corresponding cleat member in plurality of cleat members 204. Moreover, in conjunction with inner chassis 202, plurality of fabric protrusions 350 may help to secure plurality of cleat members 204 to sole structure 110.

Referring now to FIG. 6, the approximate size and/or geometry of each fabric protrusion could vary. Some fabric protrusions, for example first forefoot fabric protrusion 361, may have approximately tapered conical, or frustum conical, shapes. Other fabric protrusions, for example first heel fabric protrusion 371, may have approximately ridge-like, or elongated, shapes. It should be understood that the approximate size and/or geometry of each fabric protrusion may depend on the approximate size and/or geometry of the corresponding cleat member. In other words, the size and/or geometry of a fabric protrusion may generally be adapted to properly engage and support the corresponding cleat member, which can have any number of different sizes and shapes.

In some embodiments, one or more fabric protrusions may be configured with holes. For example, in the current embodiment, plurality of fabric protrusions 350 are associated with plurality of holes 380. As one example, first forefoot fabric protrusion 361 includes first hole 381. Each of the corresponding fabric protrusions may include similar holes. This arrangement allows for portions of a cleat member to extend through each fabric protrusion, as described in further detail below.

Figure 7:
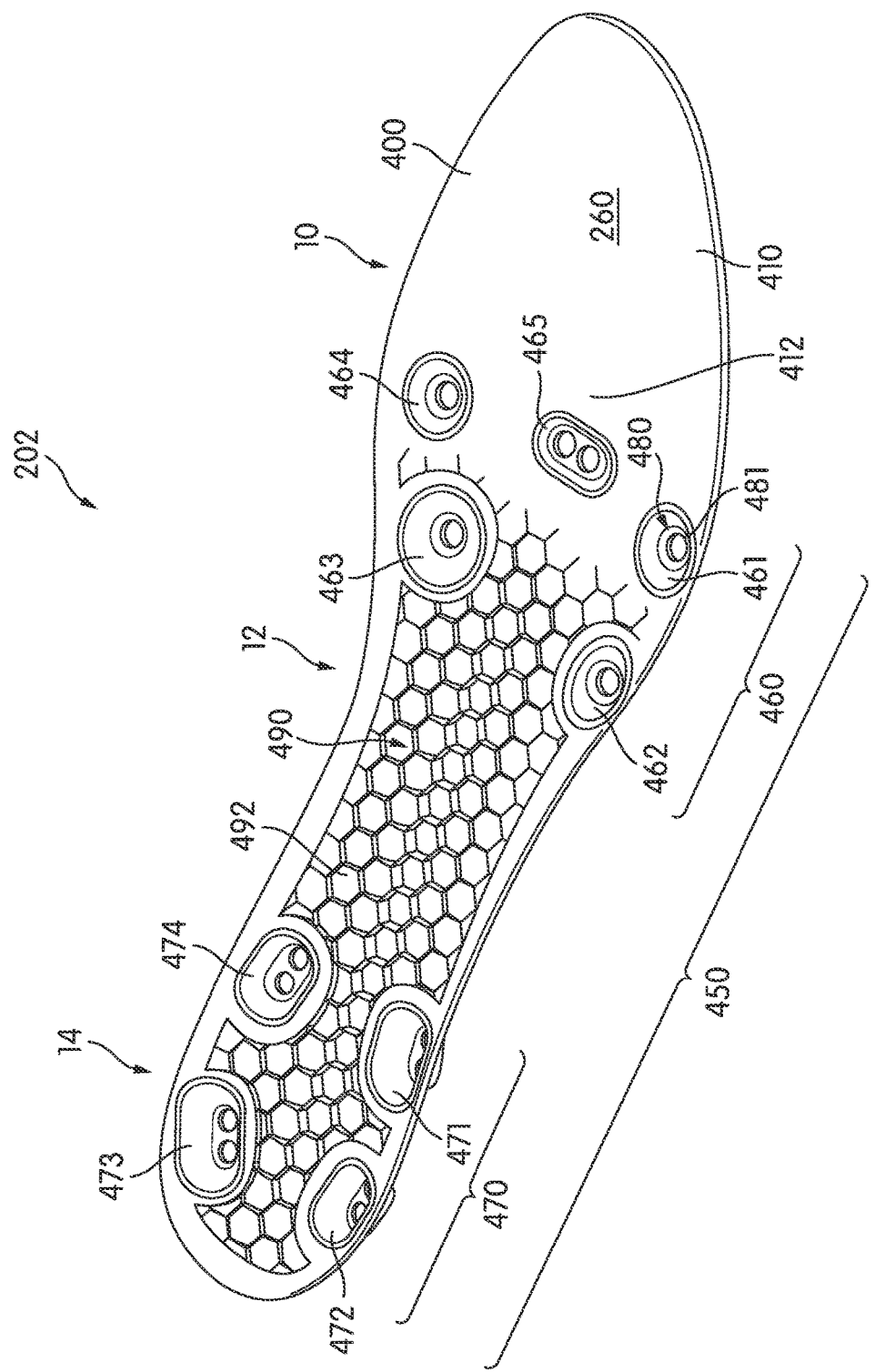
FIG. 7 is an isometric view of an embodiment of an inner chassis.
Figure 8:
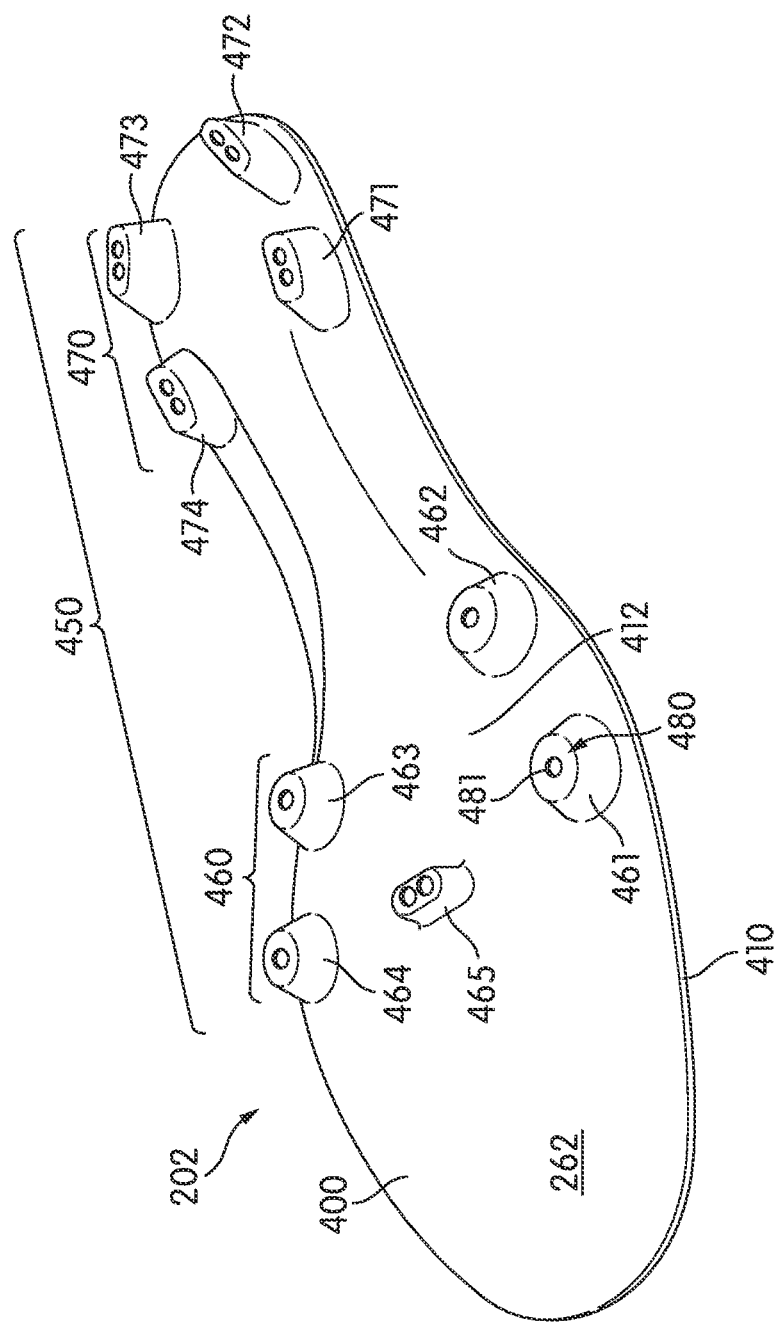
FIG. 8 is an isometric view of the inner chassis of FIG. 7, where the lower surface is visible.

FIGS. 7 and 8 illustrate isolated isometric views of an embodiment of inner chassis 202. In particular, FIG. 7 illustrates an isometric view of first surface 260 of inner chassis 202, while FIG. 8 illustrates an isometric view of second surface 262 of inner chassis 202. Referring to FIGS. 7 and 8, in some embodiments, the overall geometry of inner chassis 202 may be slightly contoured. Moreover, in some embodiments, the approximate geometry of inner chassis 202 may be slightly concave on first surface 260, and may further include some regions of relatively high curvature, as discussed in further detail below.

In the embodiment shown in the figures, inner chassis 202 may include base portion 400, but no sidewall portions. However, other embodiments may include raised sidewall portions that correspond to sidewall portion 302 of fabric layer 200. For purposes of reference, base portion 400 of inner chassis 202 may be divided into peripheral portion 410 and a central portion 412 that is disposed inwardly of peripheral portion 410.

Inner chassis 202 may include provisions to enhance the functionality of cleat members. In some embodiments, the geometry of inner chassis 202 may be configured with features to facilitate attachment of, and stability for, one or more cleat members. In some embodiments, inner chassis 202 may comprise plurality of chassis protrusions 450. Plurality of chassis protrusions 450 may be structural features integrated into inner chassis 202. In some embodiments, plurality of chassis protrusions 450 correspond to portions of inner chassis 202 that are convex with respect to second surface 262 of inner chassis 202 and concave with respect to first surface 260 of inner chassis 202. In other words, plurality of chassis protrusions 450 may generally protrude outwardly from second surface 262 and may likewise be characterized as recessed or sunken in, with respect to first surface 260.

Plurality of chassis protrusions 450 may be further divided into forefoot chassis protrusion set 460 and heel chassis protrusion set 470. Forefoot chassis protrusion set 460 comprises first forefoot chassis protrusion 461, second forefoot chassis protrusion 462, third forefoot chassis protrusion 463, fourth forefoot chassis protrusion 464 and fifth forefoot chassis protrusion 465. Heel chassis protrusion set 470 comprises first heel chassis protrusion 471, second heel chassis protrusion 472, third heel chassis protrusion 473 and fourth heel chassis protrusion 474. In order to facilitate enhanced functionality for cleat members, the placement of plurality of chassis protrusions 450 may be selected such that each chassis protrusion is located in a region corresponding to an associated cleat member. For example, the number, size, approximate shape and configuration of chassis protrusions of forefoot chassis protrusion set 460 may generally correspond to the number, size, approximate shape and configuration of cleat members of forefoot cleat member set 220. Similarly, the number, size, approximate shape and configuration of chassis protrusions of heel chassis protrusion set 470 may generally correspond to the number, size, approximate shape and configuration of cleat members of heel cleat member set 230. As described in further detail below, this arrangement may allow each chassis protrusion of inner chassis 202 to act as a reinforcing portion for a corresponding cleat member in plurality of cleat members 204. Moreover, in conjunction with plurality of fabric protrusions 350 of fabric layer 200, plurality of chassis protrusions 450 may help to secure plurality of cleat members 204 to sole structure 110.

Referring now to FIG. 8, the approximate size and/or geometry of each chassis protrusion could vary. Some chassis protrusions, for example first forefoot chassis protrusion 461, may have approximately tapered conical, or frustum conical, shapes. Other chassis protrusions, for example first heel chassis protrusion 471, may have approximately ridge-like, or elongated, shapes. It should be understood that the approximate size and/or geometry of each chassis protrusion may depend on the approximate size and/or geometry of the corresponding cleat member. In other words, the size and/or geometry of a chassis protrusion may generally be adapted to properly engage and support the corresponding cleat member, which can have any number of different sizes and shapes. Additionally, the size and/or geometry of each chassis protrusion of inner chassis 202 may be further selected according to the size and/or shape of a corresponding fabric protrusion of fabric layer 200. As discussed in further detail below, this arrangement allows for the cooperation of a corresponding chassis protrusion of inner chassis 202 and a corresponding fabric protrusion of fabric layer 200.

In some embodiments, one or more chassis protrusions may be configured with holes. For example, in the current embodiment, plurality of chassis protrusions 450 are associated with plurality of holes 480. As one example, first forefoot fabric protrusion 461 includes first hole 481. Each of the corresponding chassis protrusions may include similar holes. This arrangement allows for portions of a cleat member to extend through each chassis protrusion, as described in further detail below.

Referring back to FIG. 7, inner chassis 202 can include provisions to reduce weight while maintaining strength and support for sole structure 110. In some embodiments, inner chassis 202 can include various structural features that help reduce the amount of material comprising (and therefore the weight) of inner chassis 202. Some embodiments can include chambered portion 490. In the current embodiment, chambered portion 490 extends through heel portion 14, midfoot portion 12 and some of forefoot portion 10 of inner chassis 202. However, in other embodiments, chambered portion 490 could extend through any portion, including any combination of portions.

In some embodiments, chambered portion 490 may include a plurality of internal chambers. In other words, the volume of the chambered portion 490 may include a plurality of cavities that are partitioned off from one another. In one embodiment, as illustrated in FIG. 7, the volume of the chambered portion 490 may include a plurality of hexagon-shaped sections or cells forming a honeycomb pattern. In other embodiments, the volume of the chambered portion 490 may include a plurality of any geometrically-shaped sections. In some embodiments, chambered portion 490 may include ribs, ridges or a variety of protuberances. In other embodiments, chambered portion 490 may be solid and/or include ribs or ridges.

In the current embodiment, chambered portion 490 may be integrated into inner chassis 202. However, in other embodiments chambered portion 490 could be configured as a separate portion or insert for sole structure 110. An example of a stand-alone chambered member that may be used with a sole structure is disclosed in Auger et al., U.S. Pat. No. 8,713,819, and titled "Composite Sole Structure," the entirety of which is hereby incorporated by reference. In some embodiments, during a method of making a sole structure, inner chassis 202 may be formed from a first molding shot, while chambered portion 490 may be formed from a second molding shot. In such an embodiment, inner chassis 202 and chambered portion 490 could comprise substantially different materials. In still other cases, inner chassis 202 and chambered portion 490 could comprise substantially similar materials.

Some embodiments may incorporate curvature or contours into the overall geometry of chambered portion 490. For example, the current embodiment includes a keel-like portion 492 of chambered portion 490. This geometric configuration may help to strengthen inner chassis 202 by increasing the cross-sectional strength at keel-like portion 492.

Figure 9:
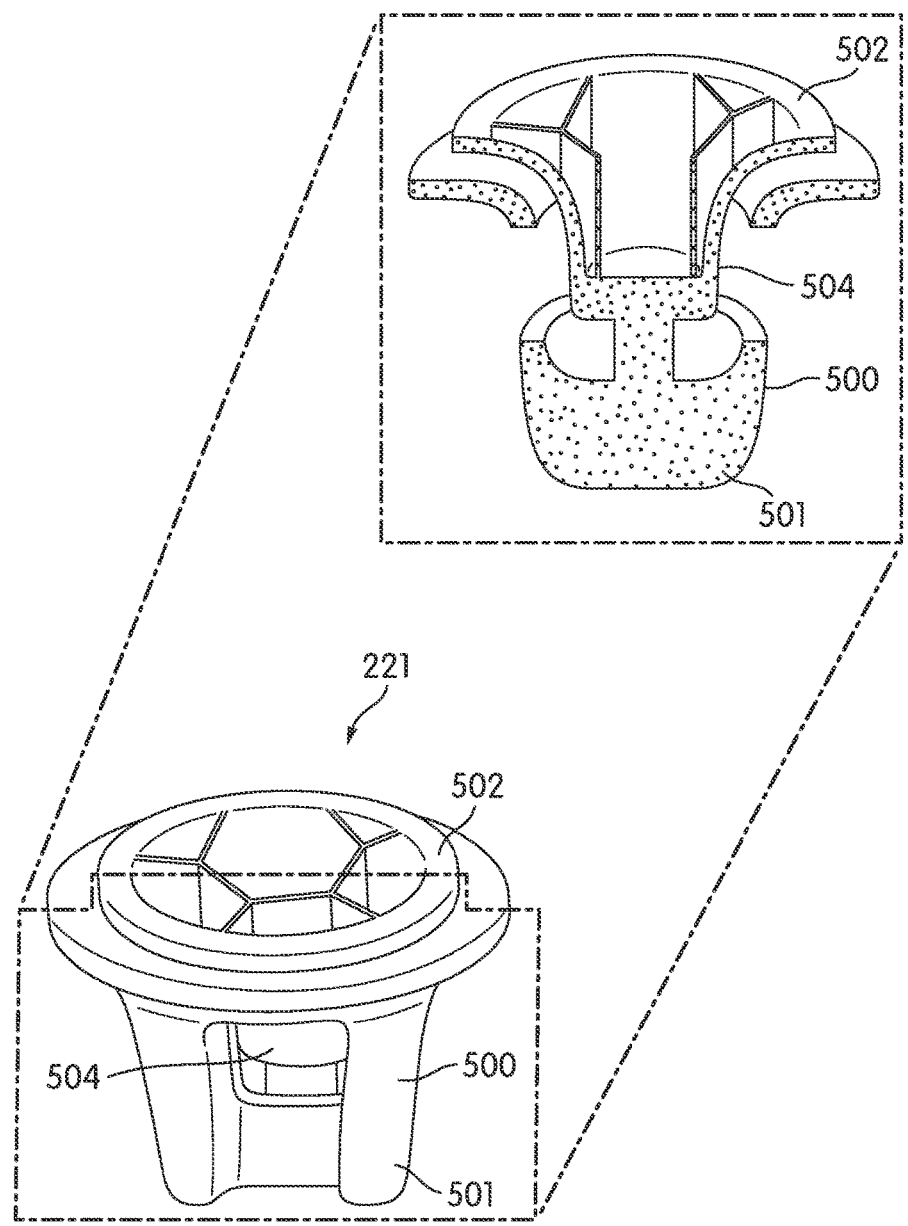
FIG. 9 is an isometric view of an embodiment of a cleat member including a cut-away view of the cleat member.

FIG. 9 illustrates a schematic isometric view of an embodiment of first forefoot cleat member 221. For purposes of clarity, only one cleat member is described in detail, however it will be understood that the remaining cleat members of plurality of cleat members 204 may be configured with similar provisions as that of first forefoot cleat member 221. Moreover, some of the details discussed here for first forefoot cleat member 221 may vary for other cleat members according to the size and/or geometry of each cleat member.

First forefoot cleat member 221, also referred to hereafter simply as forefoot cleat member 221, may comprise various distinct portions. For example, forefoot cleat member 221 may be configured with an exterior portion 500 and an interior portion 502. In some embodiments, exterior portion 500 and interior portion 502 may be joined by connecting portion 504. As illustrated in FIG. 9, exterior portion 500, interior portion 502 and connecting portion 504 may be integrally formed with one another. As discussed in further detail below, in some embodiments, exterior portion 500, interior portion 502 and connecting portion 504 are all formed simultaneously during a molding process for forefoot cleat member 221.

Figure 10:
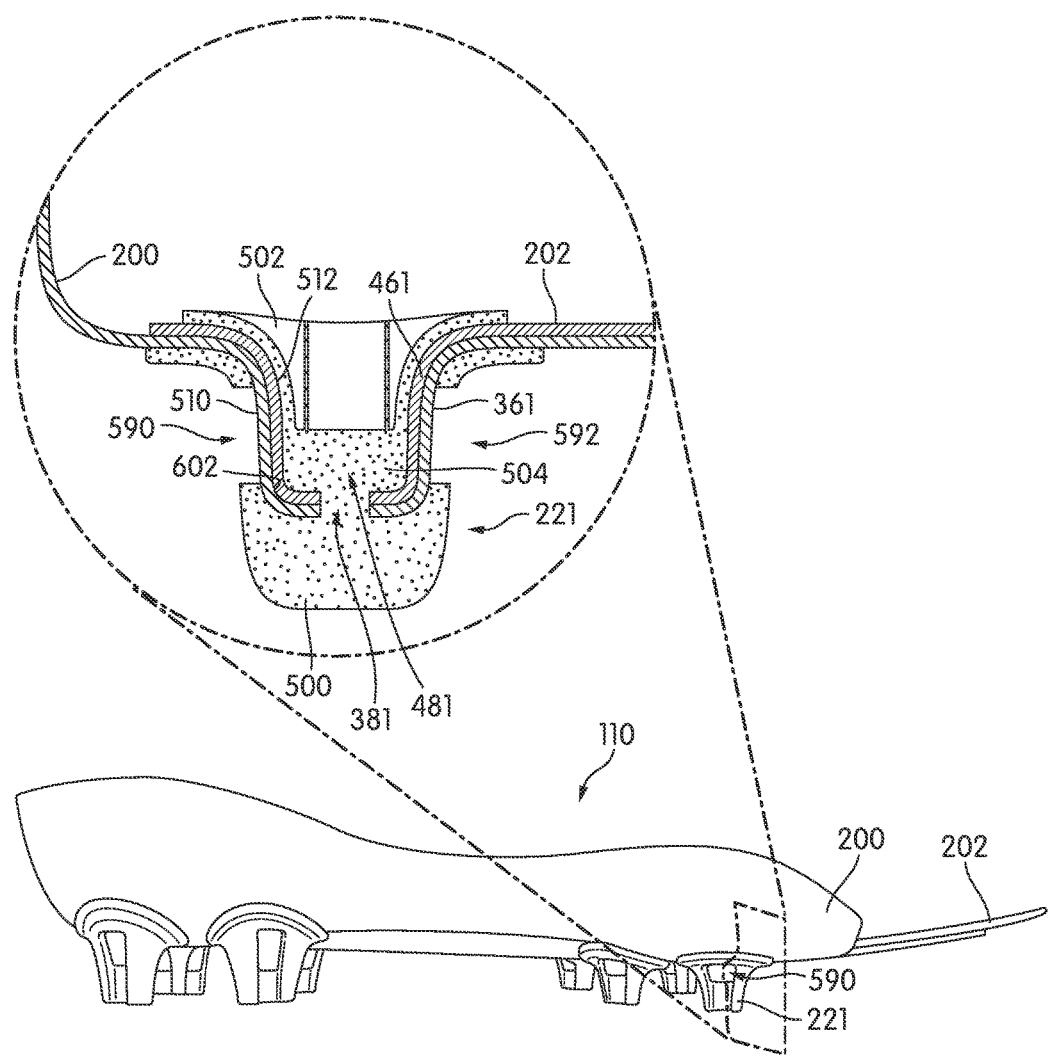
FIG. 10 is a side view of an embodiment of a sole structure including an enlarged cross-sectional view of a portion of the sole structure.

In some embodiments, exterior portion 500 may be adapted for contact with a ground surface. In some cases, exterior portion 500 may therefore be exposed on an exterior of sole structure 110, and more specifically on a corresponding protrusion of fabric layer 200 and/or inner chassis 202. As shown in FIG. 10, exterior portion 500 may be disposed on convex outer surface 510 of first forefoot fabric protrusion 361 of fabric layer 200. In other words, exterior portion 500 may cover at least some portions of first forefoot fabric protrusion 361. Additionally, the geometry of exterior portion 500, including tip portion 501 of exterior portion 500, may be selected to achieve the desired type of traction properties in forefoot portion 10.

In some embodiments, interior portion 502 may be associated with inner chassis 202. In some cases, interior portion 502 may therefore be disposed internally to sole structure 110, and more specifically may be configured to associate with the concave inner surface of a corresponding protrusion of inner chassis 202 and/or fabric layer 200. As shown in FIG. 10 below, interior portion 502 may be disposed within concave interior surface 512 of first forefoot chassis protrusion 461 of inner chassis 202.

The relative rigidities of each component of sole structure 110 can vary in different embodiments. For purposes of discussion, the rigidity of fabric layer 200, inner chassis 202 and plurality of cleat members 204 may be compared by discussing their relative rigidities. It should be understood that in some embodiments some components may have rigidities that vary by location, and therefore the relative rigidities discussed here are intended to describe differences between the average or representative rigidities of a component. Moreover, for purposes of clarity, each cleat member in plurality of cleat members 204 is characterized as having a substantially similar rigidity, though other embodiments may use varying rigidities for different cleat members according to location and/or function.

In some embodiments, inner chassis 202 may have a greater rigidity than fabric layer 200 and plurality of cleat members 204. This arrangement allows inner chassis 202 to provide the increased structural support for sole structure 110. Moreover, this arrangement may allow for the use of more flexible materials for fabric layer 200 in order to accommodate various geometric constraints such as contours and sidewall portions, as well as to provide for an exterior appearance for sole structure 110 that corresponds approximately to the outer appearance of upper 102 if this feature is desirable. Furthermore, using cleat members that are less rigid than inner chassis 202 may help provide improved grip and traction for sole structure 110, as plurality of cleat members 204 may be capable of some deflection and bending when engaging a ground surface.

While some embodiments may use an inner chassis that is more rigid than the fabric layer and/or plurality of cleat members, still other embodiments may include components having any other relative rigidities. For example, in an alternative embodiment, a fabric layer could be substantially more rigid than an inner chassis. In still another alternative embodiment, one or more cleat members could be more rigid than an inner chassis and/or a fabric layer. The corresponding relative rigidities for other embodiments may be selected to achieve any desired properties for sole structure 110, including for example, desired overall levels of strength, flexibility, support, cushioning, and/or comfort.

Different embodiments may incorporate different materials for each component. The following discusses exemplary materials for each of fabric layer 200, inner chassis 202 and plurality of cleat members 204, however other embodiments are not limited to these exemplary materials. Exemplary materials for fabric layer 200 include, but are not limited to, leathers, synthetic leathers, synthetic materials, woven materials, non-woven materials, as well as any other materials. Further examples of synthetic materials include, but are not limited to, polyester materials, aramid fiber materials, acrylic, nylon as well as other materials. Exemplary materials for inner chassis 202 include, but are not limited to, plastics, fiber reinforced composites, thermoplastics, various polymers, foams, metals, resins as well as any other kinds of materials. Finally, exemplary materials for plurality of cleat members 204 may include, but are not limited to, rubbers, plastics, thermoplastics (such as thermoplastic polyurethane), as well as other materials. Moreover, it should be understood that each component could be constructed of more than a single material and may include any combination of the materials described above, as well as combinations with materials not mentioned here.

FIG. 10 illustrates a side view of an embodiment of sole structure 110, as well as an enlarged cross sectional view of a portion of sole structure 110 at the location of first forefoot cleat member 221. As seen in FIG. 10, first forefoot chassis protrusion 461 of inner chassis 202 may be configured to fit within interior portion 602 of first forefoot fabric protrusion 361 of fabric layer 200. With this arrangement, first forefoot chassis protrusion 461 of inner chassis 202 may act to reinforce first forefoot fabric protrusion 361 of fabric layer 200, as well as first forefoot cleat member 221.

In some embodiments, first forefoot cleat member 221 may be associated with both first forefoot fabric protrusion 361 of fabric layer 200 and first forefoot chassis protrusion 461 of inner chassis 202. In some cases, exterior portion 500 of first forefoot cleat member 221 may be disposed on first forefoot fabric protrusion 361 of fabric layer 200. In particular, exterior portion 500 of first forefoot cleat member 221 may be disposed on outer surface 510 of first forefoot fabric protrusion 361. In some cases, interior portion 502 of first forefoot cleat member 221 may be disposed on first forefoot chassis protrusion 461 of inner chassis 202. In particular, interior portion 502 may be disposed on interior surface 512 of first forefoot chassis protrusion. Moreover, connecting portion 504 of first forefoot cleat member 221 may extend through first hole 381 of fabric layer 200 and first hole 481 of inner chassis 202, so as to connect exterior portion 500 and interior portion 502 of first forefoot cleat member 221.

Using the arrangement described here, both first forefoot fabric protrusion 361 of fabric layer 200 and first forefoot chassis protrusion 461 of inner chassis 202 may be disposed within first forefoot cleat member 221. In some cases, both first forefoot fabric protrusion 361 and first forefoot chassis protrusion 461 may be characterized as being disposed radially inwardly of exterior portion 500 with respect to a central axis of first forefoot cleat member 221. In some embodiments, both first forefoot fabric protrusion 361 of fabric layer 200 and first forefoot chassis protrusion 461 of inner chassis 202 may be disposed between exterior portion 500 and interior portion 502 of first forefoot cleat member 221. Thus, first forefoot fabric protrusion 361 and first forefoot chassis protrusion 461 may help provide internal structural support for first forefoot cleat member 221. Although only first forefoot fabric protrusion 361, first forefoot chassis protrusion 461 and first forefoot cleat member 221 are discussed here, it will be understood that a similar arrangement for other corresponding protrusions of fabric layer 200, protrusions of inner chassis 202 and plurality of cleat members 204 may be used.

Moreover, as interior portion 502 and exterior portion 500 are joined together by connecting portion 504, interior portion 502 may generally act to anchor first forefoot cleat member 221 within sole structure 110. In particular, interior portion 502 may help counter any force that may act to pull exterior portion 500 away from first forefoot fabric protrusion 361 of fabric layer 200. This may be accomplished by ensuring that the approximate cross sectional area of interior portion 502 is substantially larger than the approximate cross sectional areas of first hole 381 in fabric layer 200 and first hole 481 in inner chassis 200.

It is contemplated that in some other embodiments, portions of a cleat member may be disposed between fabric layer 200 and inner chassis 202. For example, in one alternative embodiment, cleat members could be attached directly to exterior surface 250 and interior surface 252 of fabric layer 200, with inner chassis 202 disposed over both the cleat members and fabric layer 200. Such an arrangement could be made, for example, by molding cleat members to fabric layer 200 and then molding inner chassis 202 to the pre-configured combination of fabric layer 200 and cleat members.

As seen in FIG. 10, some embodiments can include provisions to allow interior layers or components of a sole structure to be visible within a cleat member. For example, in the current embodiment, first cleat member 221 is shown with first cleat aperture 590 and second cleat aperture 592. This allows corresponding portions of first forefoot fabric protrusion 361 to be viewed through first cleat aperture 590 and second cleat aperture 592. Such apertures, or reveals, give visual cues to the configuration of sole structure 110 and can also be used to enhance the appearance of sole structure 110. Similarly, one or more of the remaining cleat members of plurality of cleat members 204 may be associated with similar cleat apertures (as most clearly seen in FIGS. 1 and 2, for example).

Figure 11:
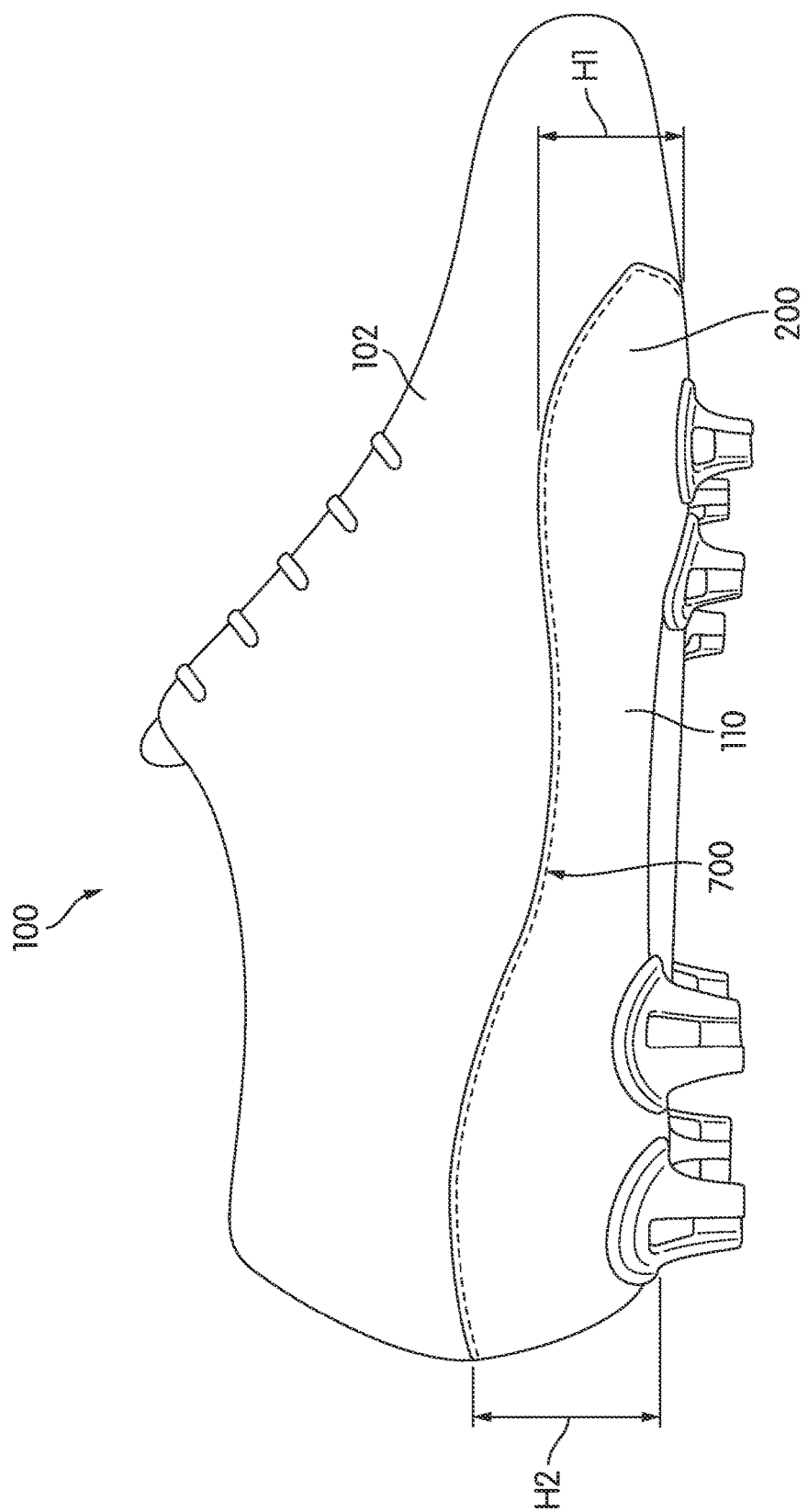
FIG. 11 is a side view of an embodiment of an article of footwear.

FIG. 11 illustrates a side view of an embodiment of article 100, including upper 102 and sole structure 110. As previously discussed, in some embodiments, sole structure 110 and upper 102 may provide a unibody-like appearance for article 100 through the use of materials that appear visually similar. For example, in some embodiments, fabric layer 200 may be made of a synthetic material with a similar surface texture and/or color as upper 102.

In some embodiments, upper 102 and fabric layer 200 may be stitched together using stitch 700. In some cases, upper 102 may be stitched over fabric layer 200. In other cases, fabric layer 200 may be stitched over upper 102. Stitching fabric layer 200 and upper 102 together may give the further appearance of an approximately monolithic outer surface for article 100.

Figure 15:
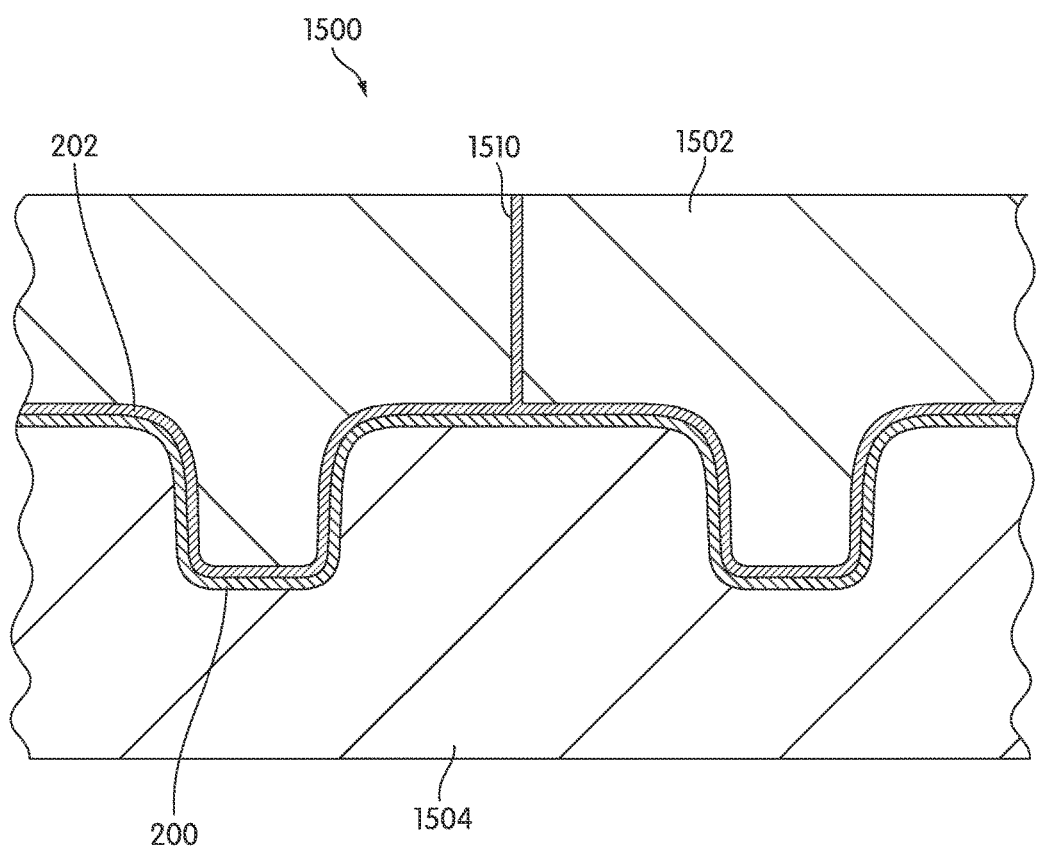
FIG. 15 is a schematic cross-sectional view of an inner chassis being injection molded onto a fabric layer, according to one embodiment.
Figure 16:
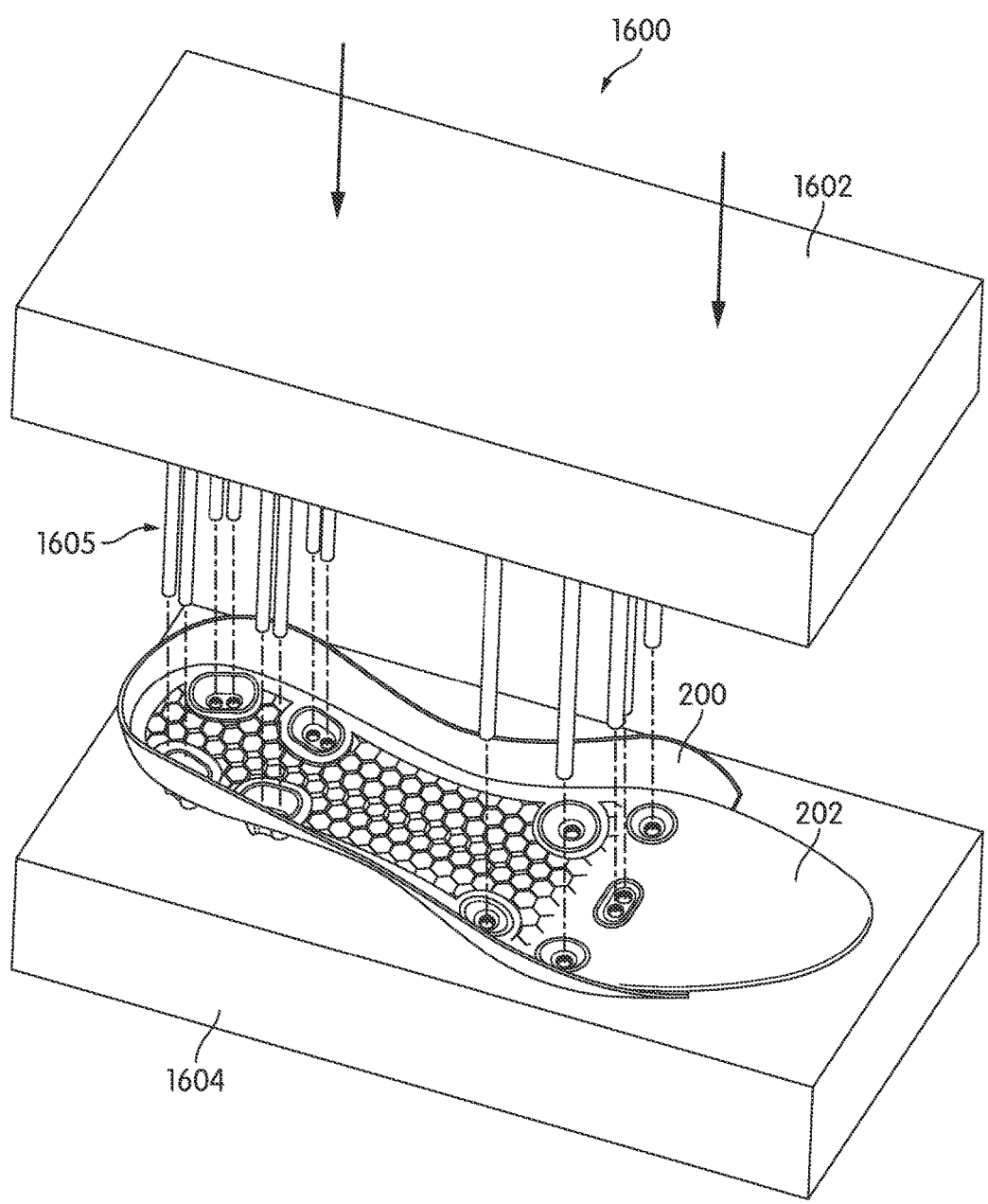
FIG. 16 is a schematic isometric view of a cutting mold being used to form holes in components of a sole structure, according to one embodiment.
Figure 17:
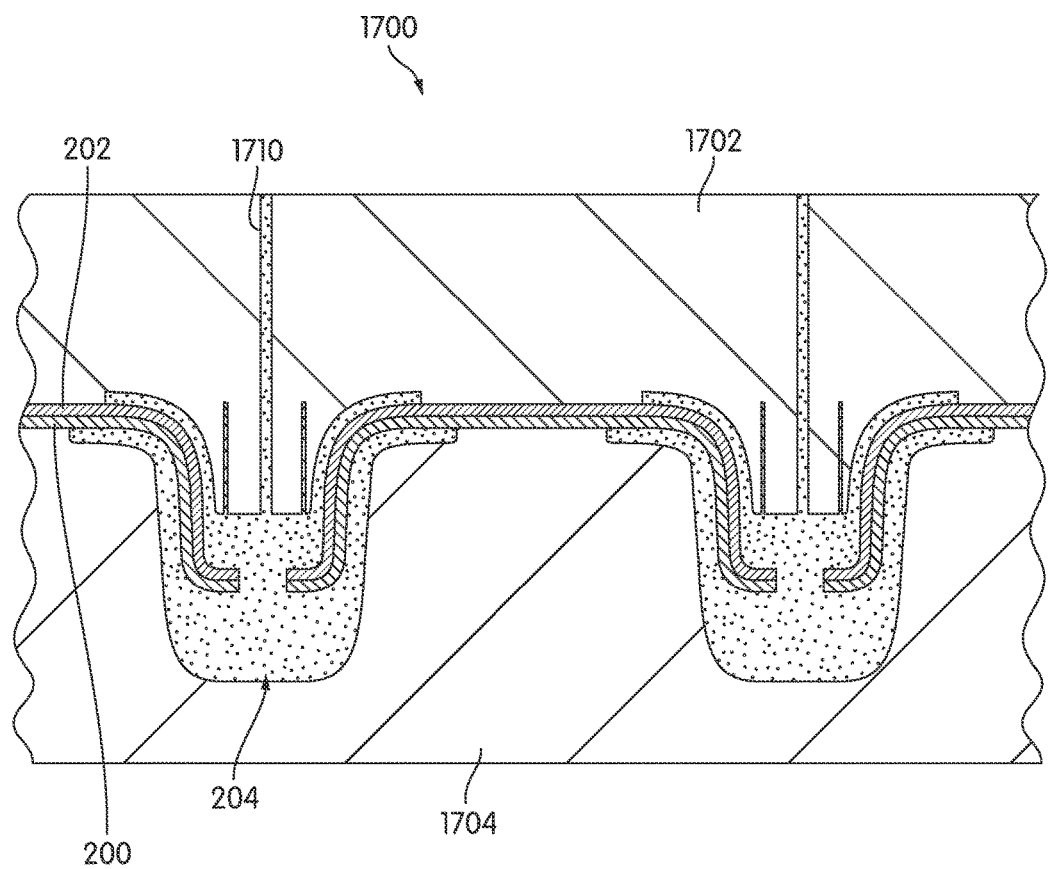
FIG. 17 is a schematic cross-sectional view of two cleat members being injection molded around components of a sole structure, according to one embodiment.
Figure 18:
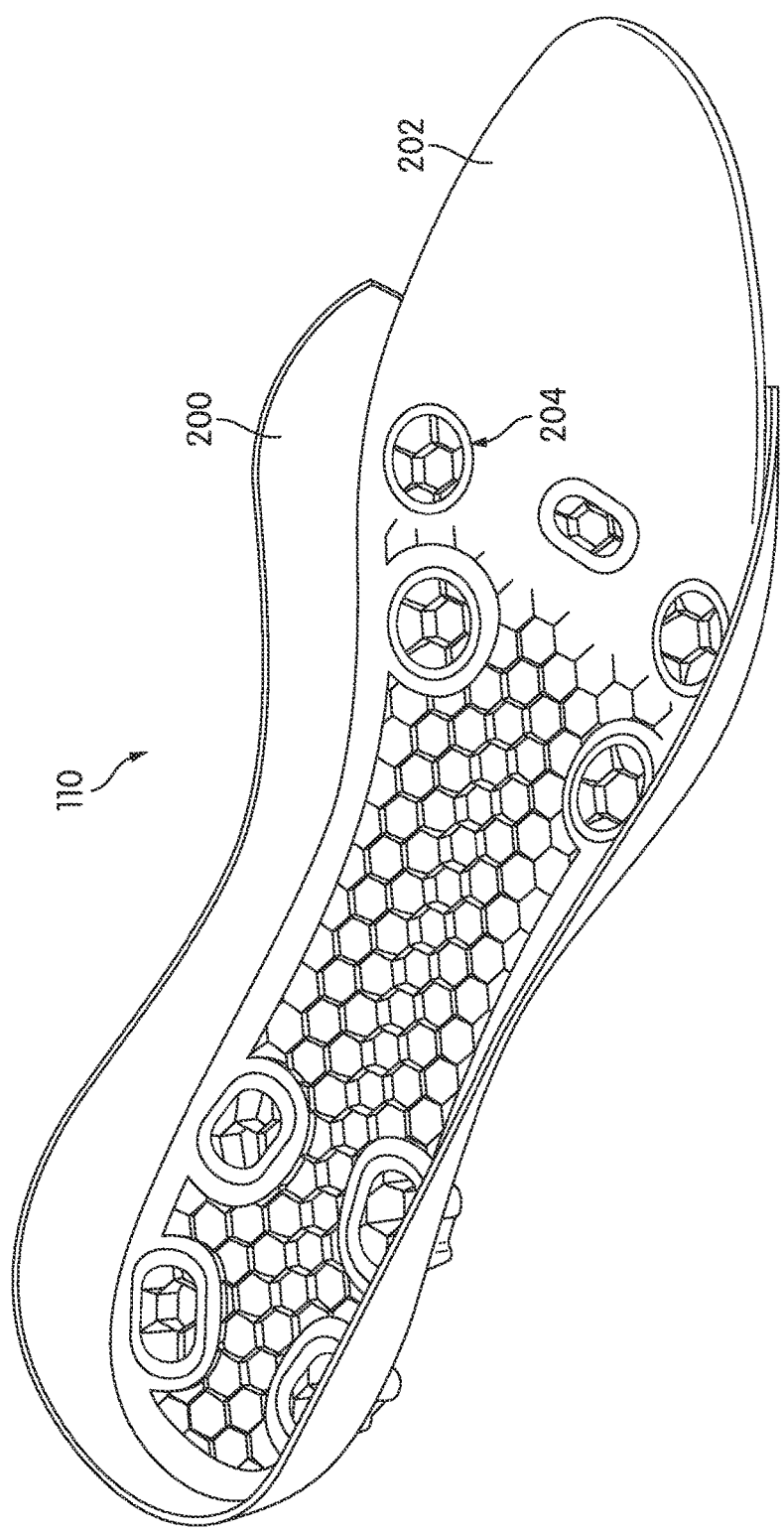
FIG. 18 is a schematic isometric view of a sole structure for an article of footwear, according to one embodiment.

FIGS. 12 through 18 are schematic views of embodiments of one possible method for making a sole structure as described above and shown in FIGS. 1 through 11. Specifically, FIGS. 12 through 14 illustrate schematic views of possible steps in a method for forming a fabric layer, FIGS. 15 and 16 illustrate schematic views of possible steps in forming an inner chassis and FIGS. 17 and 18 illustrate schematic views of possible steps in forming cleat members, all according to an embodiment.

Referring first to FIGS. 12 through 14, fabric layer 200 may be created using a thermoforming process. In some embodiments, fabric layer 200 initially has a planar configuration 1201. Fabric layer 200 may placed inside a thermoforming assembly 1200 while in the planar configuration 1201. For purposes of illustration, thermoforming assembly 1200 is shown schematically as comprising a top thermoforming plate 1202 and a bottom thermoforming plate 1204, which include corresponding shaping portion 1203 and shaping recess 1205, respectively. By clamping top thermoforming plate 1202 and bottom thermoforming plate 1204 together with fabric layer 200 inserted between them, as shown in FIG. 13, the applied pressure in combination with heat may be used to reshape fabric layer 200. As seen in FIG. 14, following this thermoforming process fabric layer 200 has acquired a non-planar or contoured geometry.

For purposes of clarity, the process for thermoforming fabric layer 200 shown in FIGS. 12 through 14 is schematic and different embodiments may use different thermoforming techniques for reshaping fabric layer 200. Any of the various methods known in the art for thermoforming materials may be used. Moreover, the process of reshaping fabric layer 200 can be accomplished using other techniques known for shaping various kinds of fabrics, including synthetic materials.

Referring now to FIG. 15, once fabric layer 200 has been formed, inner chassis 202 may be molded over fabric layer 200 using a mold assembly 1500. Mold assembly 1500 may include a top molding plate 1502 and a bottom molding plate 1504. In this case, mold assembly 1500 could be a liquid injection type mold, such that a molding material is injected through molding channels 1510 in order to produce the desired geometry for inner chassis 202. Various embodiments can include provisions for molding different portions of inner chassis 202, including provisions for molding chambered portion 490 (see FIG. 7). In still other embodiments, inner chassis 202 could be separately formed and later attached or bonded to fabric layer 200.

As previously discussed, some embodiments can include holes within the protrusions of fabric layer 200 and inner chassis 202. Referring to FIG. 16, these holes could be formed using cutting assembly 1600, which may further comprise a top cutting plate 1602 and a bottom cutting plate 1604. In some embodiments, the holes can be formed by associating the protrusions with plurality of cutting members 1605, which comprise individual cutting members that are aligned with corresponding protrusions. In some embodiments, each cutting member of plurality of cutting members 1605 may cut a hole in a corresponding fabric protrusion of fabric layer 200 as well as a corresponding chassis protrusion of inner chassis 202.

Referring now to FIGS. 17 and 18, plurality of cleat members 204 may also be formed through a molding process. In one embodiment, mold assembly 1700 comprises a top molding plate 1702 and a bottom molding plate 1704 that provide molding cavities for forming one or more cleat members. In one embodiment, for example, molding material for plurality of cleat members 204 may be injected through molding channels 1710 of top molding plate 1702.

In an alternative embodiment, it may be desirable to first mold one or more cleat members to fabric layer 200, before forming inner chassis 202. This may be accomplished by first inserting fabric layer 200 into a mold for injection molding one or more cleat members directly to fabric layer 200. Following this, inner chassis 202 could then be molded onto both fabric layer 200 and the molded cleat members. The resulting sole structure would include portions of cleat members disposed between fabric layer 200 and inner chassis 202. Variations in the method of making could be further made according to various bonding tendencies of the relevant materials. For example, if the desired cleat member material bonds better to the desired fabric material it may be best to first bond the cleat members to the fabric layer and later add the inner chassis.

Moreover, molding one or more cleat members onto fabric layer 200 and/or inner chassis 202 can be accomplished by injecting a molding material onto either a top side or a bottom side of the components. For example, FIG. 15 illustrates an embodiment in which molding material is injected from the side of the mold adjacent to inner chassis 202. In another embodiment, however, molding material could be injected from the side of the mold adjacent to fabric layer 200.

While the current embodiments illustrate a method where plurality of cleat members 204 may be molded separately from inner chassis 202, in other embodiments it is contemplated that plurality of cleat members 204 may formed simultaneously with inner chassis 202. In embodiments where these components are molded, the method could include a step of molding inner chassis 202 and cleat members 204 in a single shot. Moreover, as previously described, the injected material could be introduced from either side of fabric layer 200. In some embodiments, the method of molding or otherwise forming plurality of cleat members 204 and inner chassis 202 may be selected according to the type of material comprising one or more components. As one example, in an embodiment where inner chassis 202 is made of a TPU material, plurality of cleat members 204 could also be made of TPU. In such an embodiment, both inner chassis 202 and cleat members 204 could be integrally molded together using a single molding shot. As another example, in another embodiment where inner chassis 202 is made of a Nylon material, the bases of plurality of cleat members 204 could be formed of a similar Nylon material, while the tips of the plurality of cleat members 204 could be made of a softer plastic such as TPU. In such an embodiment, the bases of plurality of cleat members 204 could be integrally molded with inner chassis 202 using a shot of Nylon, while the softer cleat tips could be molded over the bases of the plurality of cleat members 204 using a second molding shot of TPU.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to methods and/or processes should not be limited to the performance of their steps in the order written, and one skilled in the art can readily appreciate that the sequences may be varied and still remain within the spirit and scope of the embodiments.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A sole structure for an article of footwear, comprising:
    a fabric layer including an exterior surface, an interior surface formed on an opposite side of the fabric layer than the exterior surface, and a first protrusion having an outer wall terminating at an end wall, the end wall extending radially inwardly from a distal portion of the outer wall and defining a first aperture;

a chassis disposed against the interior surface of the fabric layer and including a second protrusion received by the first protrusion, the chassis including a first surface in contact with the interior surface of the fabric layer within the first protrusion and a second surface formed on an opposite side of the chassis than the first surface; and a cleat member including a first portion disposed within the second protrusion and in contact with the second surface and a second portion disposed externally from the first protrusion and in contact with the exterior surface of the fabric layer, the first portion being integrally formed with the second portion.

2. The sole structure according to claim 1, wherein the cleat member includes a third portion disposed externally from the first protrusion and in contact with the exterior surface, the exterior surface of the fabric layer being exposed between the second portion of the cleat member and the third portion of the cleat member.

3. The sole structure according to claim 1, wherein the chassis is substantially more rigid than the fabric layer.

4. The sole structure according to claim 1, wherein the cleat member includes an aperture that exposes the exterior surface of the fabric layer.

5. The sole structure according to claim 1, wherein the second protrusion includes a second aperture formed through a distal end thereof.

6. The sole structure according to claim 5, wherein the cleat member includes a connecting portion that extends through the first aperture and the second aperture and connects the first portion of the cleat member and the second portion of the cleat member.

7. A sole structure for an article of footwear, comprising:
a fabric layer including an exterior surface, an interior surface formed on an opposite side of the fabric layer than the exterior surface, and a first protrusion having an outer wall terminating at an end wall, the end wall extending radially inwardly from a distal portion of the outer wall and defining a first aperture disposed at a distal end of the first protrusion;

a chassis disposed against the interior surface of the fabric layer and including a second protrusion received by the first protrusion and including a second aperture disposed at a distal end thereof, the chassis including a first surface in contact with the interior surface of the fabric layer within the first protrusion and a second surface formed on an opposite side of the chassis than the first surface;

a cleat member including a first portion disposed within the second protrusion and in contact with the second surface, a second portion disposed externally from the first protrusion and in contact with the exterior surface of the fabric layer, and a connecting portion that extends through the first aperture and the second aperture and connects the first portion of the cleat member and the second portion of the cleat member.

8. The sole structure according to claim 7, wherein the cleat member includes a third portion disposed externally from the first protrusion and in contact with the exterior surface, the exterior surface of the fabric layer being exposed between the second portion of the cleat member and the third portion of the cleat member.

9. The sole structure according to claim 7, wherein the second portion of the cleat member is attached to a convex exterior surface of the first protrusion.

10. The sole structure according to claim 7, wherein the first portion of the cleat member, the second portion of the cleat member, and the connecting portion are integrally formed.

11. The sole structure according to claim 7, wherein the first portion of the cleat member is attached to a concave surface of the second protrusion.

12. The sole structure according to claim 7, wherein the cleat member includes an aperture that exposes the exterior surface of the fabric layer.

13. A sole structure for an article of footwear, comprising:
a fabric layer including an exterior surface, an interior surface formed on an opposite side of the fabric layer than the exterior surface, and a first protrusion;

a chassis disposed against the interior surface of the fabric layer and including a second protrusion received by the first protrusion, the chassis including a first surface in contact with the interior surface of the fabric layer within the first protrusion and a second surface formed on an opposite side of the chassis than the first surface; and a cleat member including a first portion disposed within the second protrusion and in contact with the second surface, a second portion disposed externally from the first protrusion and in contact with the exterior surface of the fabric layer, and a third portion in contact with the exterior surface of the fabric layer, the fabric layer being exposed between the second portion of the cleat member and the third portion of the cleat member.

14. The sole structure according to claim 13, wherein the first portion of the cleat member is integrally formed with the second portion of the cleat member.

15. The sole structure according to claim 14, wherein the third portion of the cleat member is integrally formed with the second portion of the cleat member.

16. The sole structure according to claim 13, wherein the cleat member includes a connecting portion extending between and connecting the first portion of the cleat member and the second portion of the cleat member, the connecting portion being integrally formed with the first portion of the cleat member and the second portion of the cleat member and extending through a first aperture disposed at a distal end of the first protrusion and extending through a second aperture disposed at a distal end of the second protrusion.

17. The sole structure according to claim 13, wherein the chassis is substantially more rigid than the fabric layer.

18. The sole structure according to claim 13, wherein the chassis is substantially more rigid than the cleat member.

* * * * *